US007304912B2

United States Patent
Gendron

(10) Patent No.: US 7,304,912 B2
(45) Date of Patent: Dec. 4, 2007

(54) SCALE ADAPTIVE FILTERING

(75) Inventor: Paul John Gendron, Seekonk, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 108 days.

(21) Appl. No.: 11/345,678

(22) Filed: Feb. 1, 2006

(65) Prior Publication Data

US 2007/0177462 A1 Aug. 2, 2007

(51) Int. Cl.
*H04B 1/06* (2006.01)

(52) U.S. Cl. .................. 367/135; 367/118; 367/901

(58) Field of Classification Search ............ 367/45, 367/118, 135, 901
See application file for complete search history.

(56) References Cited

U.S. PATENT DOCUMENTS 4,207,624 A * 6/1980 Dentino et al. ............ 367/135
4,903,247 A * 2/1990 Van Gerwen et al. ...... 367/135
6,822,928 B1 * 11/2004 Carter et al. ............... 367/901

OTHER PUBLICATIONS

Gendron, Paul J., "An Emperical Bayes Estimator for In-Scale Adaptive Filtering", IEEE Transactions on Signal Processing, vol. 53, No. 5, May 2005.*
Li et al., "Object-Oriented Scale-Adaptive Filtering for Human Detection from Stereo Images", Proceedings of the 2004 IEEE Conference on Cybernetics and Intelligent Systems, Singapore, Dec. 2004.*

* cited by examiner

*Primary Examiner*—Ian J. Lobo
(74) *Attorney, Agent, or Firm*—John J. Karasek; Aisha Ahmad

(57) ABSTRACT

A scale adaptive filtering scheme is developed for underspread channels based on a model of the linear time varying channel operator as a process in scale. Recursions serve the purpose of adding detail to the filter estimate until a suitable measure of fidelity and complexity is achieved.

13 Claims, 1 Drawing Sheet

SCALE ADAPTIVE FILTERING

BACKGROUND OF THE INVENTION

1. Field of the Invention

The present invention relates generally to processing methods for adaptive filtering on a source signal for transmission, and more particularly an adaptive filtering method to identify the relationship between a source signal and a received signal.

2. Description of the Related Art

It will be readily appreciated by one skilled in the art that the use of adaptive filtering operations may be required in a variety of different signal processing applications. One example of such an area is that of acoustics and specifically sonar signaling. Adaptive filtering systems for time varying operators have broad applications. For example, echo cancellation, active and passive sonar, and equalization of communication signals employ adaptive filtering modeling regimes for extracting information from signals. These modeling regimes are often limited by available memory, computational resources, and acceptable processing delays.

Multiresolution models of time varying operators have been promoted with the idea of exploiting the sparsity or "economy" of representation attendant in them. This is a useful concept since many operators that are not shift invariant are often succinctly described in wavelet bases, the basic building block of multiresolution models. Conventional approaches have given a general framework for formulating the multiresolution filter structures and provided a fast least mean square-like estimators with an assumed maximal scale of representation. However, this assumption is often overly optimistic. In which case the maximal scale of representation or the most economical wavelet bases can be jointly estimated.

With regards to adaptive filtering, multiresolution models naturally allow estimation of the response at a given time instant based on given data. In addition, the model circumvents the need for locally stationary assumptions of time recursive algorithms. Accordingly, a larger amount of information is available for the estimation problem at each time instant. Unlike in-time estimation algorithms that are by their very nature causal or near causal, dependencies across time in the forward looking direction are not accounted for with classic in-time adaptive filtering algorithms. In-time estimation is a powerful paradigm due to its computational efficiencies and memory requirements and it continues to find broad appeal and enjoys superior performance in a variety of applications. Nevertheless in areas where fading and multipath delay do not conform to the wide sense stationary (WSS) assumption the multiresolution model is a viable solution. Other practical considerations related to using multiresolution modeling include signal processing and communication schemes involving strategies based on finite duration signaling. For example, mobile radio and underwater acoustic communications data employ a sequence of finite duration packets to transmit information. Similarly for underwater target localization by active sonar as well as radar applications source signals employ time localized "pings."

Accordingly, a need exists for a scale adaptive filtering method that is able to match a received signal based on information from a source signal by estimating a variety of parameters. A channel operator is built up in scale, and the channel operator employs time delays and frequency spreads. For this purpose, each additional incrementation of the Doppler spread is hypothesized and then tested.

BRIEF SUMMARY OF THE INVENTION

An aspect of the present invention provides a scale adaptive filtering method to produce a match of the received signal based on the source signal, by estimating the channel operator at each scale along with nuisance parameters, for example.

This and other aspects are substantially achieved by providing a system and method for scale adaptive filtering to identify a relationship between a source signal and an actual received signal. The method includes calculating a scale wherein the scale includes a time delay spread and a frequency spread, estimating at least one wavelet coefficient, determining an estimated received signal at the scale using the wavelet coefficient, determining when the estimated received signal is sufficiently similar with respect to the actual received signal, and recalculating the scale by a factor when the estimated received signal is not sufficiently similar with respect to the actual received signal.

The above and still further aspects, features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION OF THE PREFERRED EMBODIMENTS

Figure 1:
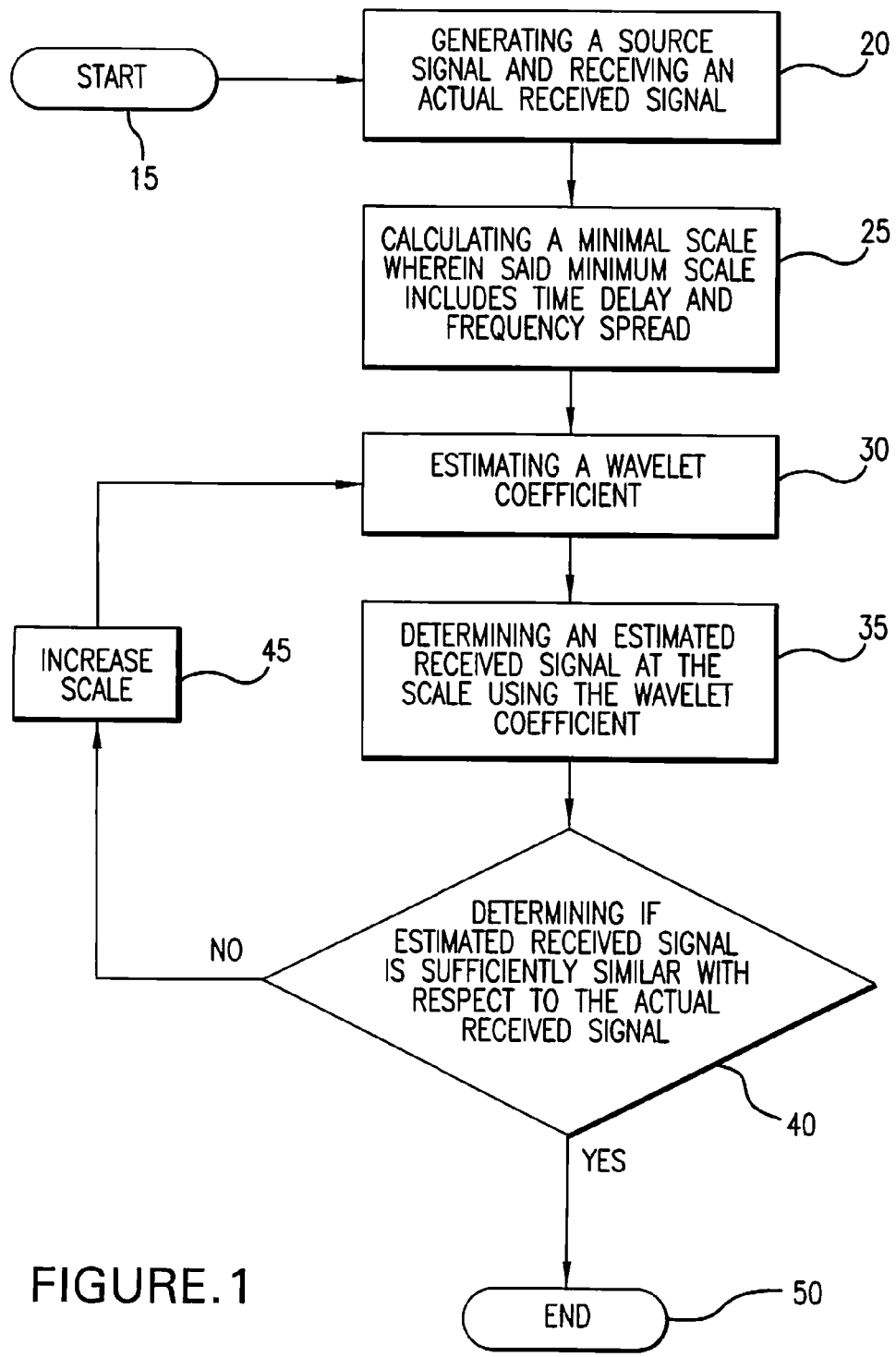
FIG. 1 is a flow chart representing a scale adaptive filtering method in accordance with an aspect of the present invention.

While the invention will be described in detail with reference to specific embodiments thereof, it will be apparent to one skilled in the art that various changes and modifications can be made therein without departing from the spirit and scope thereof. Accordingly, it is intended that the present invention covers modifications and variations of this invention provided they come within the scope of the appended claims and their equivalents.

Scale adaptive filtering is a general estimation method employed to estimate the relation between a received signal and a source signal in a variety of transmission environments. As is well known in the art, signaling information can be lost or distorted between a source signal and the received the signal.

The present invention is a novel method of applying transform function analysis to the received signal at a specific scale thus forming an estimated received signal. This estimated received signal is then compared to the actual received signal. If the estimated received signal is sufficiently complex to model the actual received signal, then the transform analysis has been successful. However, if the estimated signal is not sufficiently complex to model the actual received signal, then the scale is doubled and the transform analysis is applied again. This process is repeated, iteratively, until the estimated received signal is sufficiently complex to model the actual received signal. Sufficiency is achieved when a suitable measure of error is minimized without increasing the complexity of the channel operator.

The complexity is limited such that the noise is not included in the modeled signal. In addition, achieving sufficiently similar signals is also determined by employing the Empirical Bayes estimator (a general statistical method), wherein the estimator provides a particular cost function.

The flow chart 10 illustrates the operation of an exemplary method of scale adaptive filtering in accordance with the present invention. Block 15 is representative of the start block. Block 20 includes generating a source signal from a source such as a transmitter on a submarine or other underwater vehicle, and receiving an actual received signal at a receiver. Block 25 is descriptive of the step including calculating a minimal scale, such that the scale includes time delay information and frequency spread information.

Block 30 is descriptive of the step of estimating a wavelet coefficient to be used in a transform analysis to determine an estimated received signal. In wavelet analysis it is helpful to view a signal in terms of a fully scalable modulated window. The window is shifted along the signal and for every position the spectrum is calculated. This process is repeated many times with a slightly shorter (or longer) window for every iteration. In the end the result is a collection of time-frequency representations of the signal. In the case of wavelets, we normally do not speak about time-frequency representations but about time-scale representations, scale being a means of quantifying the time variation in the channel operator.

Block 35 is descriptive of the step of determining an estimated received signal at the minimal scale, initially chosen in Block 20 and employing the wavelet coefficient of Block 30.

Block 40 is descriptive of the step of determining if the estimated received signal is sufficiently similar to the actual received signal. In other words, a sufficiently similar signal is achieved when a suitable measure of error is minimized without increasing the complexity of the channel operator. This takes into account the amount of noise in the signal information. The noise or nuisance parameters in the actual received signal should not be modeled in the estimated received signal. If the estimated received signal is not sufficiently similar, then the method proceeds to Block 45 and the scale is increased by doubling the minimal scale and recalculating the wavelet coefficient by proceeding through Blocks 30. Block 40 checks the estimated received signal against the actual received signal. If the two signals are sufficiently similar, according to the parameters outlined above, the method proceeds to Block 50 and Ends.

The flow chart 10 is an overview of the method described by the present invention. The following is an exemplary embodiment of this system and method. Specifically, when the maximal scale/frequency of representation of the most economical wavelet coefficients can not be assumed they are jointly estimated. Accordingly, the present invention exploits sparsity of representation under a priori uncertainty regarding Doppler spread and degree of sparsity of the operator.

Overall, the present invention employs three estimators. First, the wavelet coefficients of the channel response based on the flexible and adaptable Gaussian mixture model. Second, the estimation of the minimal scale of the multi-resolution space in which the operator resides. Finally, an estimation of the nuisance parameters associated with the mixture model.

It is shown that the estimation of the maximal scale synonymous with the Doppler spread, is akin to model order selection and estimators for this parameter are provided.

These channel estimators are recursive in scale each relying on the preceeding lower scale estimate as a starting point for the next higher resolution estimate. In this framework the channel is gradually built up in scale, rather than time, with each addition of detail a greater Doppler spread (decreased coherence time) is hypothesized and is tested against the data in a model selection framework. Thus multiple resolutions of the operator are provided in sequence with finer scale details descending from the lower scale estimates starting with the linear time invariant (LTI). The algorithm as presented is limited to filter operators that are underspread (i.e. $B\tau_{max}<1$ where $\tau_{max}$ is the delay spread of the filter, B the maximal Doppler bandwidth associated with any of the scatterers, this requirement excludes the underdetermined parameter estimation case).

The following provides preliminary notation to address the time varying channel as well as an introduction to the empirical Bayes approach. We review the multiresolution decomposition of a time varying operator and the in-scale maximum likelihood estimator is presented based on the conjugate gradient algorithm for in-scale recursions. We go on to introduce a suitable sparsity prior for the time varying channel and this leads to the posterior mean and variance along with estimators of the nuisance parameters associated with the sparsity model. Lastly, we present Doppler spread estimates and stopping rules based on the maximum a posterior (MAP) criteria and on Laplace's approximation as well as the simple and effective Akaike information criteria (AIC). Finally, the usefulness of these algorithms is demonstrated on a diverse set of simulated channels with various types and degrees of Doppler spread. Improved performance of the empirical Bayes posterior mean estimator over the maximum likelihood estimator is demonstrated.

The following definitions are provided for ease of reference, and will be used throughout. Without loss of generality all matrices and vectors are assumed real. Denote the M×N matrix A by $A_{M \times N}$ and the N×1 vector $\vec{a}$ by $\vec{a}_N$. Let $\vec{1}_N$ denote a column vector of 1's, $\vec{0}_N$ denote a column vector of 0's and $I_N$ denote the identity matrix of size N by N.

Definitions:

1. For vectors $\vec{a}_N$ define the diagonal matrix with diagonal elements $\vec{a}_N$ by $\text{Diag}(\vec{a})$. For square matrices $A_{N,N}$, the vector of diagonal elements of the matrix A by $\text{diag}(A)$.

2. Stack operator, $[\bullet]^{st}$ acts on a matrix $A_{M \times N} = [\vec{a}_1, \vec{a}_2, \ldots \vec{a}_N]$ yielding $[A]^{st} = [\vec{a}_1{}', \ldots \vec{a}_N{}']'$, a stacking of A's component columns into a supercolumn with inverse denoted by $[\bullet]^{ist}$ such that $A=[A^{st}]^{ist}$.

3. Kronecker product $A_{M \times N} B_{L \times K}$ is the L M×N K matrix of weighted B blocks, having $\{m,n\}^{th}$ block entry $a_{m,n}B$.

4. Elementwise product, $(A_{M \times N} B_{M \times N})_{m,n} = a_{m,n} b_{m,n}$.

5. Vector square root, $$\left(\sqrt{\vec{a}}\right)_n = \sqrt{a_n}.$$

6. Matrix operator $\check{H}$, associated with the matrix array $H_{M \times N}$ with $n^{th}$ column $H_n$, has N+M−1 rows and N columns; the $n^{th}$ column is $\check{H}_n = [\vec{0}_{n-1}, H_n, \vec{0}_{N-n}]$.

Paragraphs 58 through 61 list a few useful properties and identities that follow directly from these definitions.

The empirical Bayes (EB) approach is useful primarily for its computational efficiency. Consider computation of $E[h|r]$, $\text{var}[h|r]$ and $E[\phi|r]$ where r represents received data, h a parameter set of interest and $\phi$ a set of nuisance parameters. Expectations over the joint density $p(h, \phi|r)$ are often not easily computed. EB methods leverage a crude assumption $p(\phi|r) \approx \delta(E[\phi|r])$ to approximate expectations via iteration $E[h|r]^l \approx E[h|r, \phi=E[\phi|r]^{l-1}]$ and are synonymous with approximations of the posterior marginal density via $p[h|r] \approx p[h|r, \phi=E[\phi|r]]$. The method is versatile with other suitable estimators in place of $\hat{\phi}=E[\phi|r]^{l-1}$ where their computation is faster or warranted by knowledge of the distribution. The penalty of this approximation is its underestimation of variance since $\text{var}[h|r]=E_\phi[\text{var}[h|\phi, r]]+\text{var}_\phi[E[h|\phi, r]]$. EB approaches therefore provide a lower bound, $\text{var}[h|r] \geq E_\phi[\text{var}[h|r, \phi]]$ that is useful when $\text{var}_\phi[E[h|\phi, r]]$ is relatively small. For adaptive filtering problems where the computational demands of Bayesian analysis are presently out of reach the approach has merit.

Define two multiresolution (M R) spaces one over time and the other over delay. Let $\{\Omega_j^\xi\}_{j \in Z}$ and $\{\Omega_k^\psi\}_{k \in Z}$ represent these respectively; thus $\Omega_j^\xi = \{\Sigma_{j=0}^J \Sigma_{l \in Z} c_{j,l} \xi_{j,l}(t)\ |\ \|\vec{c}\|_2 < \infty\}$ where $\xi_{0,0}(t) = \Sigma f_l^\xi \xi_{0,0}(2t-1)$ is the scaling function associated with this MR space, and the lowpass $f^\xi$ and highpass $g^\xi$ are a QMF pair. The scale index j increases with increasing bandwidth in agreement with the convention on the wavelets that $\xi_{j,l}(t) = \sqrt{2^{j-1}}\xi_{1,0}(2^{j-1}t-l)$ and $\xi_{1,0}(t) = \Sigma g_l^\xi \xi_{0,0}(2t-1)$.

Following the filter model of Doroslovacki, $H_B(t, \tau) \in \Omega_J^\xi \times \Omega_K^\psi$ implies $$H_B(t, \tau) = \sum_{j,k}^{J,K} \sum_{l,m}^{L_j, M_k} w_{j,k,l,m} \xi_{j,l}(t) \psi_{k,m}(\tau) \quad (1)$$

$$L_j = BT2^{j-J-1} \quad M_k = F\tau_{\max} 2^{k-K-1}$$

has approximate Doppler spread $B \propto 2^J/T$ and represents the time varying filter perfectly on the domain $(t, \tau) = (0, T) \times (0, \tau_{\max})$. The model (1) implicitly specifies the maximal Doppler spread and is therefore denoted with a subscript B.

Frequency selectivity in the band $[2^{K-k-1}, 2^{K-k}]F$ is modeled by the $F\tau_{\max} 2^{k-K}$ basis functions $\{\psi_{k,m}\}_{k,m}$ at delay shifts $2^{K-k+1}m/F$. In this way the frequency selectivity of the channel due to diverse scatterer locations and delay spreads is modeled as a superpostion of wavelet bases.

For moving scatterers Doppler spread is induced and is synonymous with an effective channel modulation over time corresponding to an imparted bandwidth to the impulse response process over time at any given delay. Modulations at time $t \approx 2^{-j-1}lT$ with durations $\propto T/2^j$ are modeled with the basis functions $\{\xi_{j,l}(t)\}_{j,l}$. These modulations correspond to each scatterers motion such that scatterers corresponding to greater accelerations will yield a channel operator with projections onto bases at fine scales (i.e. large J).

Let $H_B(n, m) = H(n/2^q B, m/F)\ q>1$ be a suitably sampled in time t and delay $\tau$ version of $H(t, \tau)$. Representing this 2-D array as a single stacked column $\vec{h}_B$ of time invariant filters via paragraph 21, definition 2 each operating to produce F/$2^q$B samples of the output, express the wavelet coefficients of $H(t, \tau)$ (nonzero up to scale J) by $$\vec{w}_J = U_J(D_\xi^{-q} I_{2^K}) \vec{h}_B \Longleftrightarrow W_J = \Psi_K' H_B D_\xi^q \Xi_J. \quad (2)$$

The matrix $D_\xi^q$ is the $2^{J+q}$ by $2^J$ matrix decimation operator associated with the M R space of $\xi$. Its adjoint $D_\xi^{q'} = D_\xi^{-q}$ is the associated interpolation operator. The columns of $\Xi_J$ and $\Psi_K$ are respectively the expansion coefficients of the wavelets $\xi_{j,l}(t)$ and $\psi_{k,m}(\tau)$ in the bases of the associated scaling functions $\xi_{0,0}(t)$ and $\psi_{0,0}(\tau)$ respectfully. The matrix $\Xi_J \in R^{BT \times BT}$ and $\Psi_K \in R^{F\tau_{\max} \times F\tau_{\max}}$ have maximal scales of $J = \lfloor \log_2 BT \rfloor$ and $K = \lfloor \log_2 F\tau_{\max} \rfloor$ respectively. The operator $U_J$ is the Kronecker product of the two wavelet transforms $U_J = \Xi'_J \Psi'_K$. The wavelet coefficients $\vec{w}_J = \{w_{j,k,l,m}, j=1 \ldots J, k=1 \ldots K, l, m \in Z^2\}$ are computable via the fast wavelet transform. The operator H is synthesized from $\vec{w}_J$ with the fast inverse wavelet transform to J+q scales (q interpolation/scaling operators added via zero appending $W_J$)

$$\vec{h}_B = (D_\xi^q I_{2^K}) U'_J \vec{w}_J \Longleftrightarrow H_B = \Psi_K W_J \Xi'_J D_\xi^{-q} \quad (3)$$

implying that $H_B$ is synthesized as constant at time scales less than $1/2^q B$. Clearly then q must satisfy $q < \log_2 F/B$ since the channel is LTI at the sampling rate. The LHS of (3) follows from paragraph 58, property 4, with $\Xi$ and $\Psi$ unitary. Compute $\vec{h}_B$ from $\vec{w}_J$ via the RHS of (3) and denote the scaling function expansion of the channel by $$\vec{h}_B^0 = U'_J \vec{w}_J. \quad (4)$$

Lastly define the time varying convolution matrix operator associated with the time varying array structure $H_B$ or synonymously its stacked representation $\vec{h}_B$ as $\check{H}_B$.

For channels with sparse arrivals that are dispersed and non-stationary the wavelet model offers a representation that is parsimonious. However for filters with peaky features in frequency, Fourier bases or autoregressive models will be more suitable. Fourier bases modeling Doppler spread will be optimal as well for the WSS channel as $T \to \infty$. Fourier bases will fail however to capture discontinuities or time localized phenomena. In addition where finite duration segments must be modeled boundaries pose severe penalties to Fourier methods, wavelets on the other hand parsimoniously capture these features. At lower frequencies associated with scatterers with smaller Doppler spread wavelets will offer near Fourier-like performance for the WSS condition. Nevertheless wavelets provide a means to model abrupt changes in channel conditions, localized phenomena in time and delay as well as minimizing boundry effects associated with finite duration signaling. Wavelet models of course are not universally appropriate for delay localized operators. For instance in the case of channels consisting of arrivals that have no dispersion in delay the standard Euclidean bases (in delay) are optimal (i.e. $H(t, \tau) = \Sigma_n \alpha_n(t) \delta_{\tau - \tau_n(t)}$). In this case the path delays and amplitudes (associated with the time changing geometry of the environment) are modeled.

The following paragraphs introduce an in-scale likelihood model from which a recursive in-scale MLE follows. A sparsity prior is then assumed and from this in-scale posterior expectation, variance and Doppler spread B estimates are derived. Empirical Bayes methods are employed throughout.

The channel response $H(t, \tau)$ of (1) with B Hz Doppler spread is observed via the source, $s(t)$ and received signal $r(t)$ through the linear model $$r(t)=\int H(t, \tau)s(t-\tau)d\tau+n(t) \quad (5)$$

where $n(t)$ is a white Gaussian noise process of known power $\sigma^2 F$.

Let $N_x(\mu, \Sigma)=\sqrt{(2\pi)^{-N}|\Sigma|^{-1}}\exp(-(x-\mu)'\Sigma^{-1}(x-\mu)/2)$. Assuming H is time-invariant over durations $1/2^q B$ and that $s(t)$ and $r(t)$ are suitably sampled at the Nyquist rate F let $N=F(T+\tau_{max})$ the received signal dimension and $M=F\tau_{max}$ the delay spread dimension. The discrete time model associated with (5) using the time varying operator of paragraph 21, definition 6, is $$p(\vec{r}|\vec{h}_B, \vec{s}, \sigma)=N_{\vec{r}}(\check{H}_B\vec{s}, I\sigma^2) \quad (6)$$

where $\check{H}_B$ represents the N by N−M+1 block convolution operator associated with $\vec{h}_B$ in (3). Synonymously using (3) express (6) as a set of stacked wavelet coefficients $$p(\vec{r}|\vec{w}_J, \vec{s}, \sigma)=N_{\vec{r}}(S_{2^q B}(D_\xi^q I_{2^K})U'_J\vec{w}_J, I\sigma^2) \quad (7)$$

where J is interchangeable with B as in (3) and for notational simplicity the conditioning on families $\xi$ and $\psi$ are assumed for time and delay respectively. With P=BT the Doppler dimension, $S_{2^q B}$ is the N×$2^q$P M block convolution operator associated with the sampled source signal $\vec{s}$. The blocks of $S_{2^q B}$ are proportional to the coherence time of $1/2^q B$ over which the channel is LTI. $S_{2^q B}$ operates on a $2^q$P long list of stacked M length LTI channel vectors to yield a channel output. To illustrate consider q=0 then $S_B$ has the form $$S_B = \begin{bmatrix} L_1 & 0 & \vdots & \vdots & \vdots & 0 \\ X_1 & 0 & & & & \vdots \\ Y_1 & L_2 & & & & \vdots \\ 0 & X_2 & & & & \vdots \\ 0 & Y_2 & \bullet & & & \vdots \\ \vdots & 0 & & & & \\ \vdots & & \bullet & & 0 \\ \vdots & & & & 0 \\ \vdots & & & \bullet & L_P \\ & & & 0 & X_P \\ 0 & \vdots & \vdots & \vdots & 0 & Y_P \end{bmatrix} \quad (8)$$

The L's (Y's) are lower (upper) triangular, and are each of size M by M. The X's are full and of size F/B−M by M. Together each [L', X', Y']' block represents a time invariant filter operator over a duration of $1/2^q B$ seconds derived from the source signal of this block. The operator $(D_\xi^q I_{2^K})$ maps the N by $2^{K+J+q}$ block convolution operator $S_{2^q B}$ of source samples, to the N by $2^{K+J}$ block convolution operator of modulated blocks associated with coefficients in a scaling expansion of $\xi$. Some useful properties are exposed by considering the case of q large. Define the limiting matrix $$S_B^\xi = \lim_{q \to \infty} S_{2^q B}(D_\xi^q I_{2^K}) \quad (9)$$

which operates on the stacked coefficients of a scaling function expansion of the channel (i.e. $\vec{h}_B^0 = U'_J\vec{w}_J$) to produce the expected value of the output of the time varying filter according to (7). The following scaling equation for such block convolution operators is informative $S_{B/2}^\xi = S_B^\xi(D_\xi^1 I_{2^K})$. Further observe that for $\xi$ Haar the scaling equation for the operator $S_B$ takes the form $$S_B = S_{2B}(D_{Haar}^1 I_{2^K}) \quad (10)$$

and while it requires no multiplies it exhibits abrupt discontinuities between blocks. In practice (9) is not computable, the upper bound on q is determined by the bandwidth of the source $q<\log_2 F/B$ such that modeling of the channel as anything but LTI over durations smaller than the sampling period is infeasible and unnecessary. For channels with reasonable regularity q>3 is sufficient in practice. For instance with q=5, a B Hz Doppler spread channel is modeled as LTI over durations <1/32 B sec.

Returning back to (7) the implied likelihood function on $$\vec{w}_J = U_J \vec{h}_B^0$$

is $$p(\vec{r}|\vec{w}, \vec{s}, J = \log_2 BT) \propto \mathcal{N}_{\vec{w}_J}\left(\tilde{\vec{w}}_J, \Delta_J\right) \quad (11)$$

$$\tilde{\vec{w}}_J = U_J \tilde{\vec{h}}_B^0, \quad \tilde{\vec{h}}_B^0 = \left(C_B^\xi\right)^{-1} S_B^{\xi'} \vec{r}, \quad \Delta_J = \sigma^2 U_J C_B^\xi U'_J$$

where the $2^{K+J} \times 2^{K+J}$ matrix $C_B^\xi = S_B^{\xi'} S_B^\xi$ is the source covariance matrix associated with the time-varying filter model. To illustrate consider again the simple case q=0 and $\xi$ Haar. It follows that $C_B = S'_B S_B$ and takes the form $$C_B = \begin{bmatrix} T_1 & V_1 & 0 & \cdots & 0 \\ V'_1 & T_2 & & \ddots & \vdots \\ 0 & & \bullet & & 0 \\ 0 & & & \bullet & 0 \\ \vdots & \ddots & & T_{P-1} & V_{P-1} \\ 0 & \cdots & 0 & V'_{P-1} & T_P \end{bmatrix} \quad (12)$$

with $T_p$ M×M Toeplitz, $V_p$ lower triangular Hankel with zeros on the main diagonal having rank M−1 and P=BT. $C_B$ is represented either by the 2P vectors of length M corresponding to the first columns of $T_p$ and $V_p$, or by the 2M+1 diagonals of $C_B$ each being of length P M. Thus $C_B$ is non-Toeplitz, banded Hermitian with 2M+1 nonzero diagonals. For $\xi \neq$ Haar $C_B^\xi$ will differ from $C_B$ in that it will be banded with width >2M+1. The vector $$\vec{b}_B = S_b^{\xi'} \vec{r}$$

in (11) is a block overlapped cross-correlation of source and received data vectors associated with the windowing scaling function $\xi_{0,0}(t)$. The weakness of the in-scale likelihood approach is simply that the parameter set grows exponentially with scale, (i.e. $PM \propto 2^J$) a severe penalty for a linear model. Nevertheless for the very limited set of spectrally flat signals the approach has some merit computationally. Signals for which $\|C_B^\xi - C_0 I_{PM}\|$ is small for some scalar $C_0$ (e.g. Gaussian white signals, maximal length sequences) $\|\vec{b}_B - \vec{h}_B\|$ will be small as well and close approximations to $\vec{h}_B$ are attained with the fast block correlation.

$$\vec{b}_B = S_B^{\xi'} \vec{r}.$$

The in-scale computation is done using the conjugate gradient method. A direct computation of $$\vec{h}_B^0$$

in (11) requires $O((PM)^3)$ a computationally impractical feat. A feasible approach assumes that $$\vec{h}_{B/2}^0$$

is known to a tolerable precision. Compute $$\vec{h}_B^0$$

starting from $$(D_\xi^1 \otimes I_{2K}) \vec{h}_{B/2}^0$$

via the conjugate gradient (CG) method. Initialization requires only $O(M^2)$ since for J=0 the system is Toeplitz. The CG algorithm has found wide application in solving banded and sparse systems. Indeed the CG algorithm has been shown to be synonymous with the multistage Wiener filter. Table 1 lists the operations necessary along with the associated computational demands. Note that only a single matrix multiplication by the sparse banded matrix $C_B^\xi$ is required per iteration. A multiply is accomplished efficiently from the 2M+1 stored diagonals of length P M. In this framework the inversion of large matrices is avoided by solving much lower (1/2) dimension problems to a given precision then using these as starting points for the next higher hypothesized dimension. The resulting maximum likelihood estimate when the CG algorithm is iterated to machine precision is termed $$\vec{h}_B^{mle}$$

and is computed via interpolation from $$\vec{h}_B^0$$

as $$\vec{h}_B^{mle} = (D_\xi^q \otimes I_{2K}) \vec{h}_B^0 \iff H_B^{mle} = [\vec{h}_B^0]^{ist} D_\xi^{-q}.$$

The CG algorithm also allows for flexibilty in the number of iterations. Computation of $\vec{h}_B^{mle}$ to machine precision may not be necessary and a solution slightly more coherent (closer to $$\vec{h}_{B/2}^{mle})$$

may be tolerable. For less computation iterate to within a ball of radius proportional to the covariance of the MLE and call such a solution $\vec{h}_B^a$, an approximate MLE. To determine this iteration number an approximate ad-hoc approach is taken. Define $\kappa$ the ratio of minimum to maximum eigenvalues of $C_B^\xi$ then at iteration $i^a$, where $$\vec{h}_B^{\{i^a\}} = \vec{h}_B^a$$

the CG solution is within a ball of radius $$\left\| \vec{h}_B^a - \vec{h}_B^{mle} \right\| = \left\| \sum_{i^a+1}^{PM} \rho_i \vec{d}_i \right\| \le 2\|\vec{h}_B^{mle}\| \sqrt{\kappa}\, \omega^{i^a}$$

where $\omega = (\sqrt{\kappa} - 1)/(\sqrt{\kappa} + 1)$.

The computation of $\kappa$ is not trivial and must be approximated for the class of source signals that are considered. Further in the case of in-scale computation proposed here the extreme eigenvalues of $C_B^\xi$ at each B would have to be approximated, at present this is impractical and an approximation is used for $\omega$. The implementation of the CG algorithm presented makes an additional ad-hoc assumption to eliminate $$\|\vec{h}_B^{mle}\|$$

from the stopping criteria based on the fact that the CG algorithm gives fairly smooth exponential convergence due to dominant eigenvectors not dominating the convergence. For this reason in practice the tightness of the $$\le 2\|\vec{h}_B^{mle}\| \sqrt{\kappa}\, \omega^{i^a}$$

bound does not vary greatly from iteration to iteration. Express the radius as $$\left\|\sum_{i^\alpha+1}^{PM} \rho_i \vec{d}_i\right\| = G \|\rho_{i^\alpha+1}\vec{d}_{i^\alpha+1}\| + \left\|\sum_{i^\alpha+2}^{PM} \rho_i \vec{d}_i\right\|$$

for some constant 0<G<1 (since the innovation components are not orthogonal). Assuming the convergence is fairly well behaved approximate $$\|\rho_{i^\alpha} + 1\vec{d}_{i^\alpha} + 1\| \approx \|\vec{h}_B^a - \vec{h}_B^{mle}\|(1-\omega).$$

A common scenario is that of a white non-fading source signal with variance $\zeta^2$. The variance of each coefficient $w_{j,k,l,m}$ is simply $\delta_j^2 = \Delta_{j,k} = \sigma^2/\zeta^2 \times B/F$. With PM=BTF$\tau_{max}$ coefficients this implies $\vec{w}_J$ has variance P×B$\tau_{max}$/SNR. In this scenario, with G=10 iterate while $\|\rho_{i+1} \vec{d}_{i+1}\| > 10(1-\omega)PB\tau_{max}/SNR$. A conservative approximation of $\kappa=1000$ corresponding to $\omega=0.93$ can be made.

TABLE 1

Computation of $\tilde{w}_J$ via conjugate gradient

| | |
|---|---|
| P = BT, M = F$\tau_{max}$, N$_c$ = F/B | |
| m$_0 \propto$ length(g$^\xi$) | |
| Initialize | |
| $\vec{x}_0 = (D_\xi^1 \otimes I_K)\vec{h}_{B/2}^0$ | O(PM × m$_o^2$) |
| $C_B, \vec{b}_B = S_B'\vec{r}$ | O(PN$_c$logN$_c$) |
| $\vec{d}_0 = \vec{e}_0, \vec{e}_0 = \vec{b} - C_B\vec{x}_0$ | |
| $\vec{f}_0 = C_B\vec{d}_0$ | O(PM$^2$) |
| while $\|\rho_i\vec{d}_i\|^2 > (1-\omega)PB\tau_{max}\delta_j^2$ | |
| $\eta = \vec{e}_i'\vec{f}_i/\vec{d}_i'\vec{f}_i,$   $\vec{d}_{i+1} = \vec{e}_i - \eta\vec{d}_i$ | O(PM) |
| $\vec{f}_{i+1} = C_B\vec{d}_{i+1}$ | O(PM$^2$) |
| $\rho_{i+1} = \vec{e}_i'\vec{d}_{i+1}/\vec{d}_{i+1}'\vec{f}_{i+1},$   $\vec{v}_{i+1} = \vec{v}_i + \rho_{i+1}\vec{f}_{i+1}$ | O(PM) |
| $\vec{x}_{i+1} = \vec{x}_i + \rho_{i+1}\vec{d}_i,$   $\vec{e}_{i+1} = \vec{b} - \vec{v}_{i+1}$ | O(PM) |
| i = i + 1 | |
| end | |
| $\tilde{h}_B = \vec{x}_{i+1}$ | |
| $\tilde{w}_J = U_J\vec{x}_{i+1}$ | O(PM × m$_o^2$) |

The Gaussian (normal) mixture can be chosen as a sparsity prior for the doppler spread channel. The previous maximum likelihood in-scale estimate of the channel assumes that all delay lags of the channel at each time contribute to the output a priori equally. Synonymously there is in the likelihood model an implicit prior of large and equal variance for each and every time-delay component of the channel operator. This assumption is simplistic for sparse channels and a modification to the likelihood approach is warranted. The prior chosen should give the model flexibility to choose components, associated with frequency selectivity and Doppler spread (time modulation) that are significant and reject those that are not. This problem is synonymous with variable selection and mixture prior assignments have been useful for such problems in both the Bayesian and empircal Bayes methodologies. For this reason the binary discrete mixture normal model $$p(w|\pi,\lambda,\ominus) = M(\pi,\lambda,\ominus) \Longleftrightarrow w|\pi,\lambda,\ominus \sim \pi N_w(0,\lambda^2) + (1-\pi)N_w(0,\ominus^2) \quad (13)$$

is chosen as a prior. Specify the prior conditional density of $\vec{w}_J$ as $$\vec{w}_J|\pi_{j,k}, \lambda_{j,k}, \in_{j,k} \sim \prod_{j,k}^{J,K} \prod_{l,m}^{L_j,M_k} M_{w_{j,k,l,m}}(\pi_{j,k}, \lambda_{j,k}, \in_{j,k}). \quad (14)$$

The mixture normal model can be useful because it captures an attribute of sparsity. For each of the significant arrival paths associated with an operator we have a normal model. For those delays for which no arrival energy is present we model these with small ($\in$) variance. The hyperparameters necessary to specify the model are summarized in a single parameter $\vec{\phi}_J = \{\pi_{j,k}, \lambda_{j,k}, \in_{j,k}\}_{j,k \le J,K}$. With the prior and likelihood specified the resulting posterior distribution to be maximized jointly over $\vec{w}_J$ and J (synonymous with $\vec{h}_B$ and B) and hyperparameters $\vec{\phi}_J$ is $$p(\vec{w}, \vec{\phi}_J|\vec{r}, \vec{s}, \sigma^2) \propto N_{\vec{w}_J}(\vec{w}_J(\vec{r}, \vec{s}), \Delta_J(\vec{s}, \sigma^2)) \times p(\vec{w}|\vec{\phi}, \sigma^2, J) \times p(\vec{\phi}_J|J) \times p(J) \quad (15)$$

The first term, the likelihood assumes independence of wavelet coefficients via the near diagonalizing property of U$_J$ on the source covariance $C_B^\xi$ and the second term the prior, is predicated on this assumption.

For ease of notation let *=l, m represent an arbitrary wavelet coefficient at time-delay location associated with l, m according to the model of Equation (1) so that $w_{j,k,*} = w_{j,k,l,m}$. In the spirit of empirical Bayes consider the posterior distribution of wavelet coefficients given all other parameters. This conditional density is shown in Equation 33 to be $$w_{j,k,*}|\tilde{w}_{j,k,*}, \sigma^2, \vec{\phi}_J \sim \Pi(\tilde{w}_{j,k,*})\mathcal{N}_{w_{j,k,*}}(\gamma(\lambda_{j,k})\tilde{w}_{j,k,*}, \gamma(\lambda_{j,k})\delta_{j,k}^2) + (1-\Pi(\tilde{w}_{j,k,*}))\mathcal{N}_{w_{j,k,*}}(\gamma(\in_{j,k})\tilde{w}_{j,k,*}, \gamma(\in_{j,k})\delta_{j,k}^2) \quad (16)$$

where the posterior mixture coefficient $\Pi(\vec{w}_{j,k,*})$ and the gains $\gamma(\cdot)$ are defined in the derivation of Equation 33. This posterior (16) has the same mixture normal form as the prior (13). There are however two important distinctions, first the posterior mixture coefficents $\Pi(\cdot)$ are functions of each individual empirical coefficient $\vec{w}_{j,k,l,m}$. Secondly the means of the mixture densities are not equal. For this reason the posterior density is not symetric and therefore its first moment $\hat{w} = E[w|\tilde{w}, \vec{\phi}_J]$ is not synonymous with the argument maximizing (16).

Since the posterior is a mixture the mean is simple to assess as $$\hat{w}_{j,k,*} = E[w_{j,k,*} | \tilde{w}_{j,k,*}, \sigma^2, \vec{\phi}_J] \quad (17)$$
$$= [\Pi(\tilde{w}_{j,k,*})\gamma(\lambda_{j,k}) + (1 - \Pi(\tilde{w}_{j,k,*}))\gamma(\epsilon_{j,k})]\tilde{w}_{j,k,*}$$

The resulting operator $$\vec{\hat{w}}_J = E[\vec{w} | \vec{\tilde{w}}_J, \sigma^2, \vec{\phi}_J]$$

attenuates smaller coefficients and leaves larger ones relatively unchanged. It is similar in form to a Wiener filter with the noticeable difference of a mixture of Wiener gains, each gain being proportional to the implicit empirical posterior probability of the associated model in the mixture.

The posterior mean of the channel $\vec{h}_B$ sampled at the rate $2^qB$ Hz follows directly from (17) and the linearity of the wavelet transform as $$\vec{\hat{h}}_B = E[\vec{h} | \vec{r}, \vec{s}, \sigma^2, \vec{\phi}_J] = (D^qI_{2^K})U_J\vec{\hat{w}}_J$$
$$\iff \hat{H}_B = \Psi_K[\vec{\hat{w}}_J]^{ist}\Xi'_J D_\xi^{-q}. \quad (18)$$

The posterior mean is useful since for the ensemble of channels associated with the mixture prior on wavelet coefficients no other estimator has smaller mean square error. It is however a biased estimator. The MAP estimate for the posterior is computationally intensive requiring iterations over every wavelet coefficient and for this reason an approximate MAP is worth considering.

$$w_{j,k,*}^{amap} = \begin{cases} \gamma(\lambda_{j,k})\tilde{w}_{j,k,*} & \text{if } \Pi(\tilde{w}_{j,k,l,m}) > 1/2 \\ \gamma(\epsilon_{j,k})\tilde{w}_{j,k,*} & \text{if } \Pi(\tilde{w}_{j,k,l,m}) < 1/2 \end{cases} \quad (19)$$

is a simple approximation and has been tested against the actual MAP, computed via Nelder-Mead iteration, and gives comparable performance in terms of MSE on simulated channels.

The conditional variance of the channel $\vec{h}_B$ is computable directly from the posterior density (16) and gives measure of the uncertainty associated with the channel after observation of the data. The derivation of Equation 34 presents proof of the following $$v_{j,k,*}^2 = \text{var}[w_{j,k,*} | \tilde{w}_{j,k,*}, \vec{\phi}_J] \quad (20)$$
$$= (\Pi(\tilde{w}_{j,k,*})\gamma(\lambda_{j,k}) + (1-\Pi(\tilde{w}_{j,k,*}))\gamma(\epsilon_{j,k}))\delta_{j,k}^2 +$$
$$= \Pi(\tilde{w}_{j,k,*})(1-\Pi(\tilde{w}_{j,k,*}))(\gamma(\lambda_{j,k}) - \gamma(\epsilon_{j,k}))^2 \tilde{w}_{j,k,*}^2.$$

The above shows that the conditional variance for each coefficient is the sum of two components. The first is a weighted average of the variances associated with the two models of the mixture. The last component represents the uncertainty of the coefficient being associated definitively with either of the two models in the mixture and is maximum for $\Pi(w)=\frac{1}{2}$. For this reason large variance is associated with coefficients with magnitude approximately $$\tilde{w}_{j,k,*} = \pm \sqrt{\frac{(\lambda_{j,k}^2 + \delta_{j,k}^2)(\epsilon_{j,k}^2 + \delta_{j,k}^2)}{\lambda^2 - \epsilon^2} \log\left(\frac{(\lambda_{j,k}^2 + \delta_{j,k}^2)}{(\epsilon_{j,k}^2 + \delta_{j,k}^2)} \frac{(1-\pi_{j,k})^2}{\pi_{j,k}^2}\right)}.$$

Define $\vec{v}_J$ as the vector of posterior variances (20) associated with $\vec{\hat{w}}_J$; then under the assumption that the wavelet coefficients are uncorrelated, $\text{cov}[\vec{w}_J] = \text{Diag}[\vec{v}_J]$. The posterior covariance of $\vec{h}_B$ is then, using (3) and paragraph 58, property 2, $$\Gamma_B = \text{cov}[\vec{h}_B] \quad (21)$$
$$= (D_\xi^q \otimes I_{2^K})U'_J\text{Diag}(\vec{v}_J)U_J(D_\xi^{-q} \otimes I_{2^K})$$
$$= (D_\xi^q\Xi_J \otimes \Psi_K)\text{Diag}(\vec{v}_J)(\Xi'_J D_\xi^{-q} \otimes \Psi'_K).$$

Determine the variance of $H_B$ at any give t, τ by computing $V_B = [\text{diag}(\Gamma_B)]^{ist}$ using paragraph 58 to express $\text{diag}(\Gamma_B) = [(D_\xi^q\Xi_J D_\xi^q\Xi_J)(\Psi_K\Psi_K)]\vec{v}_J$. This implies that the posterior variance field $V_B$ defined over t, τ is $$V_B = (\Psi_K\Psi_K)[\vec{v}_J]^{ist}(D_\xi^q\Xi_J D_\xi^q\Xi_J). \quad (22)$$

Since the operators $(\Psi_K\Psi_K)$ and $(D_\xi^q\Xi_J D_\xi^q\Xi_J)$ do not obey a scaling recursion they must be computed directly an impractical feat for channels of high dimension $BT \times F\tau_{max}$. For this reason a fast approximate $(1-\alpha)\%$ confidence interval for $H_B$ is worth pursuing. Proceed as follows; define $$\vec{w}_J^\alpha = \vec{\hat{w}}_J + z_\alpha\sqrt{\vec{v}_J} \text{ and } \vec{w}_J^{1-\alpha} = \vec{\hat{w}}_J - z_\alpha\sqrt{\vec{v}_J}$$

and transform via (3). Here of course $P[z>z_\alpha]=\alpha/2$, with $z \sim N(0, 1)$. These wavelet domain bounds produce an approximate EB high probability region for the channel as $$P\begin{bmatrix} \min(\hat{H}_B^\alpha(t,\tau), \hat{H}_B^{1-\alpha}(t,\tau)) < \\ H(t,\tau) < \max(\hat{H}_B^\alpha(t,\tau), \hat{H}_B^{1-\alpha}(t,\tau)) \end{bmatrix} \approx 1-\alpha \quad (23)$$

$$\hat{H}_B^\alpha = \Psi_K[\vec{w}_J^\alpha]^{ist}\Xi'_J D_\xi^{-q} \quad \hat{H}_J^{1-\alpha} = \Psi_K [\vec{w}_J^{1-\alpha}]^{ist}\Xi'_J D_\xi^{-q}.$$

In keeping with the empirical Bayes methodology, estimate the hyperparameters $\vec{\phi}_{J=\{\pi_{j,k},\lambda_{j,k},\in_{j,k}\}}$ as follows: first for $\pi_{j,k}$ use Donoho's threshold argument, namely that $z_t \sim N(0, \delta^2)$ implies that $$\lim_{n\to\infty} P[\max_{i\le n} |z_i| > \delta\sqrt{\log(2\pi n)}]=0. \text{ Let } \vec{1}_S(x)=\{1 \text{ for } x\in S, 0 \text{ otherwise}\}.$$

With the total number of coefficients at the j,k$^{th}$ scale denoted $N_{j,k}=2^{K-k+J-j}BTF\tau_{max}$ then an asymptotically unbiased estimate of $\pi_{j,k}$ when $\lambda_{j,k}>>\delta_{j,k}$ for the model of (13) is $$\hat{\pi}_{j,k} = \frac{\sum \vec{1}_{S_{j,k}}}{N_{j,k}}$$

where $$S_{j,k} = \{w_{j,k,l,m} : |w_{j,k,l,m}| > \delta_{j,k}\sqrt{\log(2\pi N_{j,k})}\}$$

For $\lambda_{j,k}$ use $\hat{\lambda}_{j,k}=\max_* |\vec{w}_{j,k,*}|/3$. Lastly for the $\in$'s use the assumptions that the channel $w_{j,k,*}$ and noise processes are independent with $\pi<<1/2$ the median absolute deviation (MAD) estimator of zero-mean iid (independent identically distributed) variates suggests $E^2[\text{mad}_*\vec{w}_{j,k,*}]\approx\delta_{j,k}^2+\in_{j,k}^2$ leading to the estimator $\hat{\in}_{j,k}^2=\max[\delta_{j,k}^2/20,\ [\text{mad}_*\vec{w}_{j,k,*}]^2-\delta_{j,k}^2]$.

In this and the following two paragraphs, inference regarding Doppler spread B or maximum scale $J=\log_2 BT$ is shown to be synonymous with model order selection. An EB-MAP estimate as well as rules based on Laplace's approximation and Akaike (AIC) are provided. It is convenient in keeping with the in-scale paradigm to place a prior on B synonymous with an uninformative prior on J, the maximum scale parameter. With this assumption the MAP estimate of the Doppler spread is determined by maximizing the likelihood $p(\vec{r}|J)$; the objective then is $$\hat{J} = \text{argmin}_J\{-\log p(\vec{r}|J)\},$$

$$p(\vec{r}|B=2^J/T) = \int p(\vec{r}|\vec{w}_J)p(\vec{w}_J|\vec{\phi}_J)p(\vec{\phi}_J|J)d\vec{w}d\vec{\phi}.$$

The first term in the integrand is decomposed as $$p(\vec{r}|\vec{w}_J) = (\sqrt{2\pi})^{2^J F\tau_{max}}|\Delta_J|^{\frac{1}{2}}\times N_{\vec{r}}(\breve{H}_B^{mle}\vec{s},I\sigma^2)\times N_{\vec{w}_J}(\tilde{\vec{w}}_J,\Delta_J)$$

leading to $$p(\vec{r}|B=2^J/T) =$$

$$N_{\vec{r}}(\breve{H}_B^{mle}\vec{s},I\sigma^2)\times(2\pi)^{BTF\tau_{max}/2}|\Delta_J|^{1/2}\times\int\prod_{j,k,l,m}(N_{w_{j,k,l,m}}(\tilde{w}_{j,k,l,m},\delta_{j,k}^2)\times[$$

$$\pi_{j,k}N_{w_{j,k,l,m}}(0,\lambda_{j,k}^2)+(1+\pi_{j,k})N_{w_{j,k,l,m}}(0,\hat{\in}_{j,k}^2)]p(\vec{\phi}|J))d\vec{w}d\vec{\phi}$$

Integrate over $\vec{w}$ analytically since $N_w(\vec{w},\delta^2)N_w(0,\lambda^2)=N_w(\gamma(\lambda)\vec{w},\gamma(\lambda)\delta^2)N_{\vec{w}}(0,\delta^2+\lambda^2)$ and over the 3J K parameters of $\vec{\phi}_J$ using the asymptotic result of Schwarz (i.e. $\propto (FT)^{-3JK/2}$). Under the near diagonalizing property of $U_J$ approximate $|\Delta_J|\approx\Pi_{j,k}\delta_{j,k2}$, and with the EB estimate of $\vec{\phi}_J$ and $\vec{e}_{r,B}=r-\breve{H}_B^{mle}\vec{s}$, the MAP criterion is $$\hat{B}_{MAP}=\text{argmin}_J\{Q_{MAP}(J)\} \quad (25)$$

where $$Q_{MAP}(J) = \frac{\vec{e}'_{r,B}\vec{e}_{r,B}}{2\sigma^2} - \frac{(2^J F\tau_{max})}{2}\log(2\pi\delta_{j,k}^2) + \frac{3JK}{2}\log FT - \sum_{j,k,l,m}^{J,K}\log(M_{\tilde{w}_{j,k,l,m}}(\hat{\pi}_{j,k},\hat{\lambda}_{j,k}^2,+\delta_{j,k}^2,\hat{\in}_{j,k}+\delta_{j,k}^2)). \quad (26)$$

It is somewhat striking and counterintuitive that this empirical Bayes MAP estimate of Doppler spread (25) does not require the computation of the MAP or posterior mean (PM), the residual errors being associated with that of the MLE.

To consider rules based on the residual errors associated with the posterior mean or approximate MAP channel estimate proceed as follows; let $\text{lp}(\vec{w})=\log p(\vec{r}|\vec{w})p(\vec{w}|\vec{\phi},J)$ (noting that this is proportional to the log posterior of $\vec{w}$ expand about $\vec{w}^{map}$; $\text{lp}(\vec{w})\approx \text{lp}(\vec{w}^{map})+(\vec{w}-\vec{w}^{map})'\text{lp}''(\vec{w}^{map})(\vec{w}-\vec{w}^{map})/2$. Approximate $\text{lp}''(\vec{w}^{map})\approx -V^{-1}$ and substitute the posterior mean $\hat{\vec{w}}_J$ and covariance $V_B$ yielding $$p(\vec{r}|J) \approx p(\vec{r}|\hat{\vec{h}}_B)|2\pi|^{BTF\tau_{max}/2}|V_B|^{\frac{1}{2}}\int p(\hat{\vec{w}}_J|\vec{\phi}_J,J)p(\vec{\phi}|J)d\vec{\phi}.$$

With $|V_B|^{1/2}=\Pi\vec{v}_J^{1/2}$ and the asymptotic result of Scharwz applied to $\vec{\phi}_J$ the resulting Laplace approximation rule is $$\hat{B}_{LAP}=\text{argmin}_J\{Q_{LAP}(J)\} \quad (27)$$

where $$Q_{LAP}(J) = \quad (28)$$
$$-\log p(\vec{r}|\hat{\vec{w}}_J) - \log p(\hat{\vec{w}}|J) + \frac{3JK}{2}\log FT - \frac{1}{2}\sum_{j,k,l,m}\log 2\pi v_{j,k,l,m}^2.$$

The first term $$-\log p(\vec{r}|\hat{\vec{w}}_J)$$

is a measure of the quality of the posterior mean channel estimate to predict the data $\vec{r}$ and is synonymous with the coding complexity of the data given the estimate of the channel. From this perspective it is proportional to the length of the best code of the residuals of the data predicted by the adaptive filter estimate and source signal. Similarly the sum of the second and third terms is proportional to the information necessary to specify this particular channel estimate $\vec{h}_B$ from the prior assignment to the resolution associated with the posterior variance.

A popular and heuristically simple alternative is Akaike's Information Criteria (AIC) (for a reasonable explanation of this ad-hoc measure see Kay). The associated penalty cost in this case is simply one half the number of parameters of the model $$\hat{B}_{AIC=ar\,gmin J}\{Q_{AIC}(J)\} \quad (29)$$

where $$Q_{AIC}(J) = -\log p(\vec{r}\,|\,\hat{\vec{w}}_J) + \frac{3JK}{2} + 2^{J-1} F\tau_{max}. \quad (30)$$

These in-scale algorithms were tested on a diverse set of simulated multipath channels to determine their relative performance in jointly estimating the channel operator and its Doppler spread.

The considered test channels are of the form $$H(t, \tau) = \sum_{m=1}^{M_P} \alpha_m(t) \chi_m(\tau - d_m(t)) \quad (31)$$

having $M_p$ independent component paths. Each path has an associated arrival spreading function $x_m(\cdot)$ that is time invariant. Doppler spread is induced by both the path gain processes $\alpha_m(t)$ and the path delay processes $d_m(t)$. Arrival path delay times $d_m(t)$ and amplitudes $\alpha_m(t)$ are modeled as correlated Gaussian variates with respective covariances $c_{d_m}(\tau)=c_{d_m}(0)(1-\tau/T_{d_m})$ for $|t|<T_{d_m}$, 0 otherwise and $c_{\alpha_m}(t)=c_{\alpha_m}(0)(1-t/T_{\alpha_m}$ for $|t|<T_{\alpha_m}$, 0 otherwise. A realization of such a channel is then generated given the $3M_d$ parameters: the weight functions $\chi_m(\cdot)$, and coherence times $T_{d_m}$ and $T_{\alpha_m}$. An associated Doppler bandwidth for each of these path processes is termed $B_{\alpha_m}=2/T_{\alpha_m}$ and $B_{d_m}=2/T_{d_m}$. For each test case the Doppler spread is termed the maximum of these constituent Doppler bandwidths. Varying the correlation times associated with the processes $d_m$'s and $\alpha_m$'s as well as the spreading shapes $\chi_m$'s allows for the simulation of processes that are diverse and realistic.

Four channel operators were tested, the number of paths and the maximal Doppler spread for each of the cases is listed in Table 2.

TABLE 2

Test cases for time-varying channel parameters

| case | $M_d$ | B (Doppler spread) |
|---|---|---|
| LTI | 4 | 0 Hz |
| TV α's | 4 | 1 Hz |
| TV delay's | 4 | 4 Hz |
| TV delay's & α's | 4 | 4 Hz |

Some channels share a common feature of sparsity in that while each scatterer path exhibits Gaussian uncorrelated scattering each delay lag does not. Thus the channels are not wide sense stationary-uncorrelated scattering (WSS-US).

Gaussian source $\vec{s}$ and additive noise signals of the same spectra where used in the simulations. The source signal correlation $c_{\vec{s}}(\tau)=E[s(t)s(t+\tau)]=\zeta^2(1-2\tau F)$ for $|\tau|<2F$, 0 otherwise. $c_{\vec{n}}(\tau)=\sigma^2 c_{\vec{s}}(\tau)/\zeta^2$. The channels were simulated for durations of approximately T=8 seconds and a bandwidth F=2 k Hz.

In these simulations $C_B$ and $S_B$ were used as approximations to $C_B^\xi$ and $S_B^\xi$ in the CG algorithm for the computational savings associated with its tight banded structure. In practice the number of C G iterations to compute $\vec{h}_B^a$ starting from $(D_\xi^{-1}I_{2^K})\vec{h}_{B/2}^a$ hB/2 to a chosen precision of $0.1\times P\times\delta^{\prime 2}$ is approximately 5. Further iterations are used to compute the MLE. The algorithm was implemented with Daubechies orthogonal wavelets order 3 ($\psi=D(3)$) in delay and $\xi=D(5)$ in time for $U_J$ under the folded wavelet assumption. The interpolation operator $D_\xi^{-q}$ of (3) in this simulation was implemented as a windowed sinc for the simplicity associated with its linear phase and q was set at 4 so that for a given hypothesized J the estimate was assumed LTI over durations of $T/2^{J+4}$.

The normalized mean square error for the channel estimates $$\|e_h\|_2^2 = \left[\frac{(\hat{\vec{h}}_B - \vec{h}_B)'(\hat{\vec{h}}_B - \vec{h}_B)}{\vec{h}_B'\vec{h}_B}\right]$$

is computed for each of the estimators; the approximate MLE $$\hat{\vec{h}}_B^a$$

(aMLE), the MLE, $\vec{h}_B^{mle}$, the posterior mean $$\hat{\vec{h}}_B$$

(PM) and the approximate MAP.

Granular noise is present in the MLE and represents the cost incurred by the use of this unbiased estimator. With the sparsity prior the PM is able to provide a more regular estimate that exhibits better MSE performance. However this performance comes at a cost of bias in the PM estimate. This bias is pronounced in the peaks of the channel response estimate. Indeed it is easily verified by considering near $L_\infty$ loss functions. Tests were conducted with $\|e_h\|_p$ p=8 to approximate $L_\infty$ loss and demonstrate that the MLE often outperforms the PM even for these sparse test cases.

To determine the ability of the in-scale approach to accurately determine Doppler spread the algorithm can be tested on an LTI operator. One important attribute of the in-scale approach is that LTI filters can be recognized even at quite low SNR. The in-scale algorithm can identify LTI channels with only the computation of 2 iterations in the scale domain. The first iteration is the LTI estimate. The second is the scale 1 iteration from which the LTI is compared favorably and the in-scale iteration is ceased. This is in stark contrast to in-time recursions where computational resources are distributed over time without respect to the actual coherence time of the channel process. Thus for finite duration signaling the in-scale approach has a distinct advantage. The Doppler complexity measure is a minimum for the $J=0^{th}$ scale estimate for all three criteria (AIC, LAP, MAP) and does not fall below this at greater resolution estimates. Here each of the Doppler costs are normalized by $E[\log p(\vec{r}|\vec{h}_B)] = -(1+\log \sigma^2)FT/2$. It is further noted that for sparse channels in delay the mixture normal model is an effective sparsing model affording a 2 dB improvement in performance over the MLE estimate at the $0^{th}$ scale estimate. The PM estimate exhibits greater gains at higher scales demonstrating the robustness of the posterior mean and MAP estimates against variance of the Doppler spread rule.

Monte Carlo simulations reveal slightly greater variability of the MAP stopping rule over that of the AIC or LAP. We can demonstrate that a model of the time varying filter as a process in scale yields estimators that provide joint estimation of channel response and coherence time. Coherence time is modeled in this framework as model order selection.

An MLE, approximate MLE, approximate MAP and posterior mean were derived along with AIC, Laplace approximation and MAP Doppler estimation procedures based on empirical Bayes assumptions. These algorithms were tested and compared with one and other on a number of simulated time varying channels. As expected the posterior mean demonstrates improvement in performance over the MLE and approximate MAP for time varying channels relative to mean square error.

All of the estimators presented for in-scale processing rely on the conjugate gradient algorithm to compute approximate MLE estimates from the previous lower scale estimate. From the MLE and conditional variance along with a sparsity prior the posterior mean is a simple adaptive thresholding of wavelet coefficients. In this framework computation is distributed over scale in the estimator and this contrasts with in-time Kalman methods that distribute computation in time for an assumed coherence time. Joint estimation of channel parameters and coherence time is fundamental to in-scale estimation as it provides a stopping rule at which additional computation is unlikely to provide an improved estimate. Lastly covariance estimates of the time varying model are provided and approximate high probability regions are shown to be easily accessible. These present useful computationally efficient empirical Bayes lower bounds on certainty bands of the channel operator.

The implications for multisensor and multichannel estimation are apparent. Computational resources can be automatically and seemlessly focused on system nodes that exhibit greater Doppler bandwidth. This implies two advantages, first channels that are more coherent will not waste computational resources. Secondly performance degradation is limited since overfitting of data associated with overly complex models is less likely.

Important issues relating to computation and performance relative to in-time recursions must be addressed. Future work should focus on comparison of in-scale recursions with in-time recursions (e.g. Kalman, RLS) to give bounds on signal duration, channel sparsity and coherence time measures where the in-scale regime is to be favored. The in-scale approach could be broadened to include other scale stepping increments rather than the classic octave band partition presented here. Mixed scale-time methods can also be envisioned for block processing over time.

The following matrix and Kronecker properties are useful.

Properties:
1. $[A \, H \, B]^{st} = (B'A)[H]^{st}$
2. $(A \, CB \, D) = (AB)(CD)$
3. $(AC)(BD) = (AB)((CD))$ where $A_{M \times N} C_{M \times N}$ and $B_{L \times K} D_{L \times K}$.
4. $(AB)^{-1} = A^{-1}B^{-1}$, and $(AB)' = A'B'$
5. $\text{diag}(A \, B) = [AB'] \vec{1}_M$ where $A_{M \times N}$ and $B_{N \times M}$
6. $\text{diag}(AB) = \text{diag}(A)\text{diag}(B)$ where $A_{N \times N}$ and $B_{N \times N}$ and $B_{L \times LM/N}$
7. $A \vec{b} = A \, \text{Diag}(\vec{b}) \vec{1}_N$
8. $A \, \text{Diag}(\vec{b}) = A(\vec{b}' \vec{1}_M)$ where $A_{M \times N}$ and $\vec{b}_{N \times 1}$ The following result is useful when computing the posterior variance of a time varying operator for: $A_{K \times L}, C_{L \times K}, B_{M \times N}, D_{N \times M}, \vec{v}_{LN \times 1}$ if: $V = (AB)\text{Diag}(\vec{v})(CD)$ then: $\text{diag}(V) = [(AC') \hat{\times} (BD')] \vec{v}$ \hfill (32)

Proof:

$$\begin{aligned} V &= ((A \otimes B) \odot (v' \otimes \vec{1}_{KM}))(C \otimes D) & \text{property 8} \\ \text{diag}(V) &= [(A \otimes B) \odot (v' \otimes \vec{1}_{KM}) \odot (C' \otimes D')]\vec{1}_{LN} & \text{property 5} \\ &= [((A \otimes B) \odot (C' \otimes D'))\text{Diag}(\vec{v})]\vec{1}_{LN} & \text{property 8} \\ &= [(A \otimes B) \odot (C' \otimes D')]\vec{v} & \text{property 7} \\ &= [(A \odot C') \otimes (B \odot D')]\vec{v} & \text{property 3} \end{aligned}$$

The following form of the posterior distribution is useful. The prior and likelihood on wavelet coefficients are $w_{j,k,*} | \pi_{j,k}, \lambda_{j,k} \sim \pi_{j,k} N_{w_{j,k,*}}(0, \lambda_{j,k}^2) + (1-\pi_{j,k})N(0, \epsilon_{j,k}^2)$ and $\tilde{w}_{j,k,*} | w_{j,k,*} \sim N_{\tilde{w}_{j,k,*}}(w_{j,k,*}, \delta_{j,k}^2)$ respectively. The marginal density of empirical coefficients is then $$p(\tilde{w}_{j,k,*} | \vec{\phi}_J) = \int p(\tilde{w}_{j,k,*} | w_{j,k,*})p(w_{j,k,*} | \pi_{j,k}, \lambda_{j,k}, \epsilon_{j,k}) dw_{j,k,*} =$$
$$\pi_{j,k} N_{\tilde{w}_{j,k,*}}(0, \lambda_{j,k}^2 + \delta_{j,k}^2) + (1-\pi_{j,k}) N_{\tilde{w}_{j,k,*}}(0, \epsilon_{j,k}^2 + \delta_{j,k}^2).$$

Since
$$N_{w_{j,k,*}}(\tilde{w}_{j,k,*}, \delta_{j,k}^2) N_{w_{j,k,*}}(0, \lambda_{j,k}^2) =$$
$$N_{w_{j,k,*}}(\gamma(\lambda_{j,k})\tilde{w}_{j,k,*}, \gamma(\lambda_{j,k})\delta_{j,k}^2) N_{\tilde{w}_{j,k,*}}(0, \lambda_{j,k}^2 + \delta_{j,k}^2)$$

where $\gamma(\lambda) = \lambda^2/(\lambda^2 + \delta^2)$ is akin to a Wiener gain, a direct application of Bayes theorem $p(w|\tilde{w}) = p(\tilde{w}|w)p(w)/p(\tilde{w})$ confirms the posterior density to be $$w_{j,k,*} | \tilde{w}_{j,k,*}, \vec{\phi}_J \sim \Pi(\tilde{w}_{j,k,*}) N_{w_{j,k,*}}(\gamma(\lambda_{j,k})\tilde{w}_{j,k,*}, \gamma(\lambda_{j,k})\delta_{j,k}^2) + \quad (33)$$
$$(1 - \Pi(\tilde{w}_{j,k,*})) N_{w_{j,k,*}}(\gamma(\epsilon_{j,k})\tilde{w}_{j,k,*}, \gamma(\epsilon_{j,k})\delta_{j,k}^2)$$

-continued where $$\Pi(\tilde{w}_{j,k,*}) = \left[1 + \frac{1 - \pi_{j,k} \mathcal{N}_{\tilde{w}_{j,k,*}}(0, \epsilon_{j,l}^2 + \delta_{j,k}^2)}{\pi_{j,k} \mathcal{N}_{\tilde{w}_{j,k,*}}(0, \lambda_{j,k}^2 + \delta_{j,k}^2)}\right]^{-1} \quad (5)$$

The following form of the variance is useful. For the variance, start with $\text{var}[w_{j,k,*}|\tilde{w}_{j,k,*}, \vec{\phi}_J] = E[w_{j,k,*}^2|\tilde{w}_{j,k,*}, \vec{\phi}_J] - E^2[w_{j,k,*}|\vec{w}_{j,k,*}, \vec{\phi}_J]$. For simplicity denote the modulus square of a coefficient by $x^2 = x'x$. From the posterior density the second moment $E[w_{j,k,*}^2|\tilde{w}_{j,k,*}, \vec{\phi}_J]$ is easily evaluated as $$E[w_{j,k,*}^2 | \tilde{w}_{j,k,*}, \vec{\phi}_J] = \Pi(\tilde{w}_{j,k,*})(\gamma(\lambda)\delta_{j,k}^2 + \gamma^2(\lambda)\tilde{w}_{j,k,*}^2) + (1 - \Pi(\tilde{w}_{j,k,*}))(\gamma(\epsilon)\delta_{j,k}^2 + \gamma^2(\epsilon)\delta_{j,k}^2 + \gamma^2(\epsilon)\tilde{w}_{j,k,*}^2)$$

and of course $E^2[w_{j,k,*}|\vec{w}_{j,k,*}, \vec{\phi}_J]$ is taken from (17). The result after simplification is $$\text{var}[w_{j,k,*} | \tilde{w}_{j,k,*}, \vec{\phi}_J] = [\Pi(\tilde{w}_{j,k,*})\gamma(\lambda) + (1 - \Pi(\tilde{w}_{j,k,*}))\gamma(\epsilon)]\delta_{j,k}^2 + \Pi(\tilde{w}_{j,k,*})(1 - \Pi(\tilde{w}_{j,k,*}))[\gamma(\lambda) - \gamma(\epsilon)]^2 \tilde{w}_{j,k,*}^2. \quad (34)$$

Since $\lim_{x \to 0} \Pi(x) = 0$ and $\lim_{x \to \infty} \Pi(x) = 1$, it is easily confirmed that for $\lambda \gg \delta$ and $\epsilon/\delta \ll 1$ $$\to \lim \text{var}[w|\tilde{w}] = \delta^2 \to \lim \text{var}[w|\tilde{w}] = \epsilon^2 \quad (35)$$

while the maximum variance attainable is approximately $\text{var}[w|\tilde{w} = \tilde{w}_p] \approx \delta^2 (2 + \log(\lambda^2/\delta^2\pi^2))/4$ where $$\tilde{w}_p^2 = \arg\{\Pi(\tilde{w}) = 1/2\} \quad (36)$$
$$= \frac{(\lambda^2 + \delta^2)(\epsilon^2 + \delta^2)}{\lambda^2 - \epsilon^2} \log\left(\frac{(\lambda^2 + \delta^2)}{(\epsilon^2 + \delta^2)} \frac{(1 - \pi)^2}{\pi^2}\right)$$

What is claimed is:

1. A method for scale adaptive filtering to identify a relationship between a source signal and an actual received signal, said method comprising:
    calculating a scale wherein said scale includes a time delay of a channel operator of the actual received signal, and a frequency spread;
    estimating at least one wavelet coefficient;
    determining an estimated received signal at the scale using the wavelet coefficient;
    determining when the estimated received signal is sufficiently similar with respect to the actual received signal; and
    re-calculating the scale by a factor when the estimated received signal is not sufficiently similar with respect to the actual received signal.

2. The method of claim 1, wherein said recalculating the scale by a factor includes doubling the factor.

3. The method of claim 1, wherein determining when the estimated received signal is sufficiently similar to the actual received signal, said determining comprises:
    comparing the estimated received signal to the actual received signal; and
    determining when the nuisance parameters in the actual received signal is not greater than the estimated received signal.

4. The method of claim 1, wherein determining when the estimated received signal is sufficiently similar to the actual received signal includes employing the Empirical Bayes Estimator.

5. The method of claim 1, wherein said estimating at least one wavelet coefficient includes processing of a conjugate gradient.

6. The method of claim 4, includes processing $$\tilde{\tilde{w}}_J$$

via a conjugate gradient.

7. A system for scale adaptive filtering operable to identify a relationship between a source signal and an actual received signal, said system comprises:
    a receiver operable to receive said actual received signal; and
    a processor operable to calculate a scale wherein said scale includes a time delay and a frequency spread, estimate at least one wavelet coefficient, determine an estimated received signal at the scale using the wavelet coefficient, determine when the estimated received signal is sufficiently similar with respect to the actual received signal, and re-calculate the scale by a factor when the estimated received signal is not sufficiently similar with respect to the actual received signal.

8. The system of claim 6, wherein said processor operable to double the factor.

9. The system of claim 6, wherein said processor operable to estimate the wavelet coefficient by processing a conjugate gradient.

10. The system of claim 6, wherein said processor operable to process the wavelet coefficient by processing $$\tilde{\tilde{w}}_J$$

via a conjugate gradient.

11. A computer readable medium of instruction for adaptive filtering to identify a relationship between a source signal and an actual received signal, comprising:
    a first set of instruction adapted to calculate a scale wherein said scale includes a time delay and a frequency spread;
    a second set of instructions adapted to estimate at least one wavelet coefficient;
    a third set of instructions adapted to determine an estimated received signal at the scale using the wavelet coefficient;
    a fourth set of instructions adapted to determine when the estimated received signal is sufficiently similar with respect to the actual received signal; and a fifth set of instructions adapted to re-calculate the scale by a factor when the estimated received signal is not sufficiently similar with respect to the actual received signal.

12. A computer readable medium of claim 10, further comprising:

a sixth set of instructions adapted to recalculate the scale by the factor including doubling the factor.

13. A computer readable medium of claim 10, further comprising:

a seventh set of instructions adapted to estimate at least one wavelet coefficient including processing a conjugate gradient.

* * * * *